United States Patent [19]

Herrmann

[11] Patent Number: 5,256,097
[45] Date of Patent: Oct. 26, 1993

[54] PROCESS FOR PRODUCING A DIRECTLY HEATED CATHODE

[75] Inventor: Ulrich Herrmann, Senden, Fed. Rep. of Germany

[73] Assignee: Licentia Patent-Verwaltungs-GmbH, Frankfurt am Main, Fed. Rep. of Germany

[21] Appl. No.: 788,534

[22] Filed: Nov. 6, 1991

[30] Foreign Application Priority Data

Nov. 7, 1990 [DE] Fed. Rep. of Germany ....... 4035361

[51] Int. Cl.⁵ .............................. H01J 5/50; H01J 9/04
[52] U.S. Cl. ......................................... 445/28; 445/36; 313/332; 219/121.64; 228/262.61
[58] Field of Search ..................... 445/28, 36, 32, 27; 219/121.14, 121.64; 228/263.18; 313/332

[56] References Cited

U.S. PATENT DOCUMENTS

| 684,092 | 10/1901 | Potter | 313/332 |
| 1,022,482 | 4/1912 | Howell | 313/332 |
| 3,701,921 | 10/1972 | Wiedenmann | 313/332 |
| 3,785,019 | 1/1974 | Chiola et al. | 445/27 |

FOREIGN PATENT DOCUMENTS 55-74147  6/1980  Japan ............... 219/121.14

Primary Examiner—Mark Rosenbaum
Assistant Examiner—Jeffrey T. Knapp
Attorney, Agent, or Firm—McGlew and Tuttle

[57] ABSTRACT

A process providing a cathode coil made of tungsten and fastening it to molybdenum straps by brazing with platinum by supplying thermal energy in a punctiform manner.

7 Claims, 1 Drawing Sheet

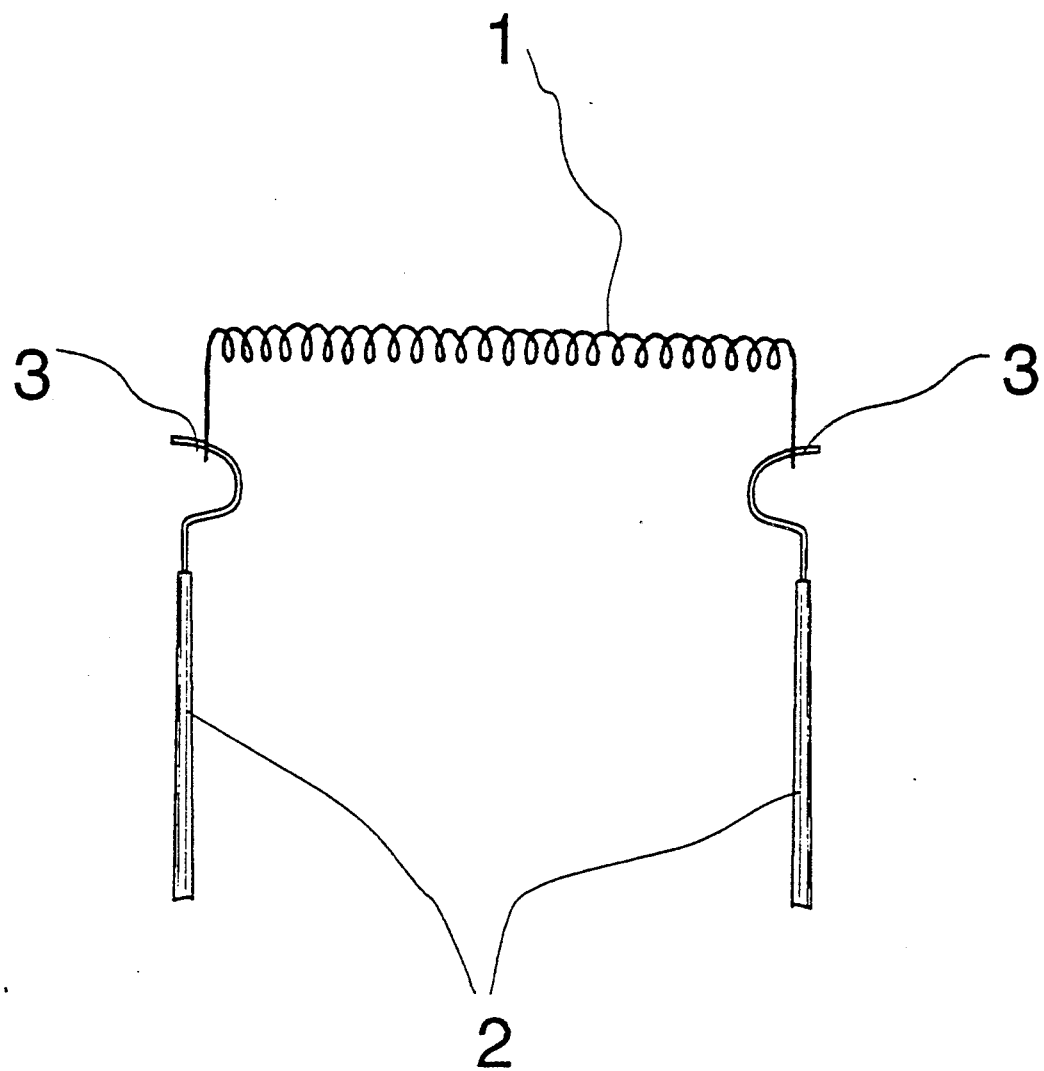

PROCESS FOR PRODUCING A DIRECTLY HEATED CATHODE

FIELD OF THE INVENTION

The present invention pertains to a process for producing a directly heated cathode for a cathode ray tube, especially for X-ray tubes and more particularly to a cathode coil consisting of tungsten fastened in a load bearing manner to cathode braces made of high melting metal by means of heat supplied in a punctiform manner.

BACKGROUND OF THE INVENTION

It has been known that cathode coils made of tungsten wire are used in X-ray tubes. Such tungsten coils are held on metal straps or metal leads, which consist of, e.g., molybdenum. Heating coils are fastened to the leads generally by welding, e.g., argon arc welding or microplasma welding. The cathode coils may be damaged in the area of fastening during such welding processes.

SUMMARY AND OBJECTS OF THE INVENTION

It is a primary object of the present invention to provide an improved mode of fastening for a cathode coil on metal straps consisting of a difficult-to-melt metal.

According to the invention, a process is provided for producing a directly heated cathode for cathode ray tubes, particularly for X-ray tubes. The cathode coil is provided consisting of tungsten, and is fastened in a load-bearing manner to a support means of cathode braces formed of a high-melting metal by supplying heat in a punctiform manner. The coil has characteristics that promote heating of and consequent emission of electrons for x-ray production when an electric current is passed through the coil. The fastening is provided by employing platinum as the brazing filler.

The cathode coil is preferably fastened to the cathode braces made of molybdenum. The brazing may be performed by means of laser energy supplied in a punctiform manner. The brazing heat may also be provided by a welding arc ignited at the brazed joint. Preferably, the brazing is carried out under a protective gas atmosphere, particularly a protective gas stream such as argon.

One essential advantage of the present invention is considered to be the fact that damage, especially cross-sectional damage to the tungsten coil, is avoided. The brazing described is particularly suitable for fastening cathode coils made of tungsten to holding straps made of molybdenum. Thus, it is particularly suitable for producing cathodes for X-ray tubes, because it withstands even high temperatures.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

The only figure is a schematic representation showing the produced directly heated cathode according to the invention.

The figure shows a cathode coil 1 made of tungsten for an X-ray tube. At its two ends 3 it is fastened to a support means of holding straps 2, which preferably consist of molybdenum. These materials possess sufficient strength even at elevated temperatures.

According to the present invention, the ends 3 of the tungsten coil are fastened to the straps or braces 2 by brazing, using platinum as the brazing filler.

The heat needed for brazing is preferably supplied in the same manner as is usually done in the case of welding. Consequently, it is supplied in a directed, punctiform manner to the fastening site.

According to a preferred heating method, the heat is supplied via a laser beam of appropriate energy density directed toward the brazed joint or the brazing filler. The brazed joint is scavenged with a protective gas, e.g., argon. This may be provided by directing an argon protective gas stream at the brazing site.

According to another heating method, an arc is ignited at the brazed joint. A method such as used for argon arc welding is preferably used.

The methods described guarantee holding and contacting of the tungsten coil that is stable even at high temperatures, without the risk of damage to the coils.

While a specific embodiment of the invention has been shown and described in detail to illustrate the application of the principles of the invention, it will be understood that the invention may be embodied otherwise without departing from such principles.

What is claimed is:

1. A directly heated cathode for emitting electrons in an X-ray tube, the cathode comprising:
   means for emitting electrons, said means including a coil of tungsten, said coil having characteristics that promote heating of and emission of electrons for x-ray production when an electric current is passed through said coil;
   support means for solely supporting said coil, during use said support means including a molybdenum strap, one end of said strap being positioned adjacent an end of said coil;
   a brazed connection exclusively connecting said end of said coil to said end of said strap, said brazed connection being load-bearing an exclusively holding said coil stable at high temperatures, said brazed connection using platinum as the brazing filter, and said brazed connection being formed by a punctiform heat source directed at said ends of said strap and said coil, and spaced from a remained portion of said coil to maintain said electron emission characteristics of said remainder of said coil.

2. A cathode according to claim 1 wherein: said punctiform heat source is provided by directing laser energy at said brazed connection.

3. A cathode according to claim 1 wherein: said punctiform heat source is supplied by applying a welding arc to said brazed connection.

4. A process for producing a directly heated cathode for an X-ray tube, the process comprising the steps of:
   providing a cathode coil consisting of tungsten and having characteristics to cause heating and emission of electrons for X-ray production;
   providing support means for solely supporting said cathode coil, said support means including a molybdenum brace;

positioning an end of said cathode coil adjacent an end of said brace;

exclusively heating said brace and said end of said cathode coil with a laser beam used as a punctiform heat source, said heating of said end of said cathode coil being spaced from a remainder of said cathode coil to maintain said electron emission characteristics of said remainder of said cathode coil during use;

exclusively fastening said end of said cathode coil to said end of said brace in a loading-bearing and high temperature stable manner by brazing with platinum as a brazing filler and directing a protective gas stream at the brazing site to provide a protective gas atmosphere at the brazing site.

5. A process according to claim 4, wherein said protection gas is argon.

6. A directly heated cathode for an X-ray tube, formed by the steps of:

providing means for emitting electrons, said means including a coil of tungsten, said coil having dimensions to cause heating of and emission of electrons from said coil;

providing support means for solely supporting said coil during use said support means including a molybdenum brace;

positioning an end of said coil adjacent an end of said brace;

exclusively heating sad brace and said end of said coil with a laser beam used as a punctiform heat source, said heating of said end of said coil being spaced form a remainder of said coil to maintain said electron emission characteristics of said remainder of said coil;

exclusively fastening said end of said coil to said end of said brace in a load-bearing and high temperature stable manner by brazing with platinum as a brazing filler and directing a protective gas stream at the brazing site to provide a protective gas atmosphere at the brazing site.

7. A cathode in accordance with claim 6, wherein:
said end of said cathode brace is exclusively fastened to said end of said coil.

* * * * *